June 22, 1926.

E. B. CARTER

WASHER FEEDER

Filed July 9, 1924          6 Sheets-Sheet 1

1,590,080

Witness:
W. H. Hall

Inventor.
E. B. Carter.
by Hazard and Miller
Attorneys.

June 22, 1926.

E. B. CARTER

WASHER FEEDER

Filed July 9, 1924    6 Sheets-Sheet 3

Inventor
E. B. Carter
By Hazard and Miller
Attorneys

June 22, 1926.

E. B. CARTER

WASHER FEEDER

Filed July 9, 1924     6 Sheets-Sheet 6

Inventor
E. B. Carter
BY Hazard and Miller
Attorneys.

Patented June 22, 1926.

1,590,080

UNITED STATES PATENT OFFICE.

EDWARD B. CARTER, OF LOS ANGELES, CALIFORNIA, ASSIGNOR OF ONE-HALF TO CHARLES A. BOWERMAN, OF LOS ANGELES, CALIFORNIA.

WASHER FEEDER.

Application filed July 9, 1924. Serial No. 724,982.

My present invention relates to machines or apparatus for feeding washers, and primarily to such apparatus for feeding washers to rubber heel molds. In the manufacture of rubber heels, one of the principal difficulties encountered therein has been the placing of washers upon the pins in the heel molds. The purpose of these washers is to provide a solid bearing for the nails which secure the rubber heels to the shoes. Were it not for these washers, the rubber heels would very quickly and easily tear or rip away from the heel, and it would not be practicable to provide heel nails with sufficiently large heads to themselves act as a bearing or retaining means. Therefore, as a necessary step in the manufacture of rubber heels. it is necessary to place upon the pins in a heel mold, an individual washer for each pin. Heretofore, this operation of placing washers upon the pins has been carried out substantially and entirely by hand, as no machines or devices, so far as I am aware, have been devised, which would satisfactorily position the washers upon the pins in a heel mold. This operation of washering the pins has been an exceedingly difficult one, due to the necessary hand work. In preparing the heel mold to receive the "biscuits" or partially set heels, the operator must first bake the mold in an oven to a predetermined relatively high degree of heat. Thereupon, the operator, with asbestos gloves on his hands, removes the heel mold from the oven, for the subsequent operations. The operators must necessarily be powerful men, as these molds are extremely heavy. Having removed the mold from the oven, the operator then must strip off his asbestos gloves, and one by one, by hand, place a washer upon each of the pins in the heel mold. An expert operator requires at least six minutes to perform this operation, and at the end of this time the mold has cooled to such a degree that it is necessary to replace the same in the oven, and reheat it. During the operation of placing the washers on the pins, the operator frequently drops the same, and if he attempts to pick them off the heel mold, he burns himself. If he leaves them there, he is fined or penalized a certain sum for each heel thus spoiled by having a washer or the imprint of a washer on its face.

Therefore, an important object of my present invention is to provide means for placing washers upon the pins in a heel mold in a qnick and efficient manner.

I accomplish this desirable result by providing means which will simultaneously position a washer upon each and every pin in the heel mold. In actual practice, by the use of my novel invention, it has been found that an average of one washer in three thousand or more will be improperly positioned or not placed upon its pin. Thus my present device can be said to be substantially one hundred per cent perfect.

In carrying out my present invention, I provide a suitable washer holding magazine, into which a plurality of washer guide assembly boards, or transfer plates, may be inserted and loaded with washers subsequently removed from the magazine, and placed upon a mold to position the washers upon pins in the mold. These assembly boards are then removed from the mold, leaving the washers to be cast into the rubber heels.

A further feature of my invention consists in the fact that I may utilize washer guide assembly boards for heel molds of different sizes, which will cooperate with a standard washer magazine assembly.

A further feature of my present invention is to provide a washer magazine assembly adapted to hold as many stacks of washers as there are pins in the mold, and to provide washer guide assembly boards to cooperate with the magazine, and receive a washer from each stack, said washer guide assembly boards adapted to be removed from the magazine with the loaded washers, and applied to a mold to position the washers upon each of the pins in the mold, simultaneously.

My novel invention can also be utilized in other fields than that of heel mold washering, and can be made in varying shapes and sizes for the particular work to be per-formed, but I have herein illustrated the same as applied to devices for washering heel molds for illustrative purposes only.

Other objects and advantages will appear from the drawings and specification.

The drawings illustrate a machine for feeding washers to rubber heel molds in accordance with the principles of my invention.

The details of construction and operation shown in the drawings are as follows:

The rubber heel gang mold base 1 is a flat rectangular body having a supporting dowel 2 extending upwardly at one side, and the washer guide assembly board 3 is guided into place by the dowel 2.

The gang rubber heel mold is made in three pieces, the mold base 1, the die which makes the depth and perimeter of the heels, and the top which makes the upper faces of the heels, the top and die being not shown because they are removed before the washers are applied to the pins and have nothing to do with the present invention.

The rubber heel gang mold base 1 has a plurality of heel bottom recesses or layouts 4, one for each rubber heel to be molded, and pins 5 are mounted in the recesses 4 and arranged as desired to produce a definite type of rubber heel, the pins being adapted to produce nail holes in the heel and to support washers in the mold to be embedded into the heel so that the nail holes will lead through the washers. Shoulders 6 are formed upon the pins 5 to support the washers, and points 7 extend upwardly from the shoulders to pass through the holes in the washers and guide the washers to the shoulders 6. Any desired number of the recesses 4 may be made in a gang mold 1 as required to make a series of rubber heels at one operation, and the recesses 4 may vary in size as required to make heels of various sizes for various sizes of footwear, the only requirement being that the heels shall be all of the same type and the pins 5 all arranged in the same plan, varying only in the sizes of the plans.

Figure 15:
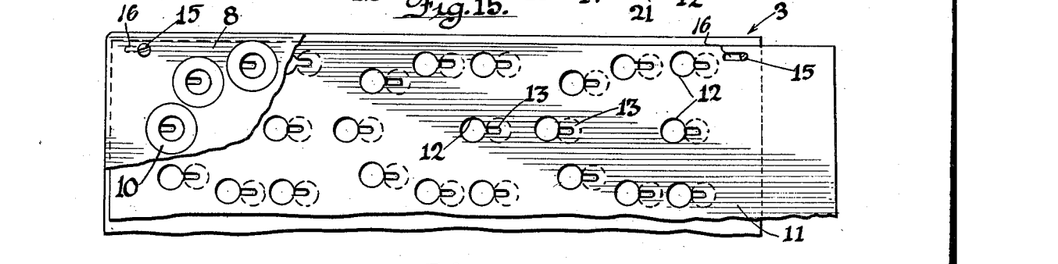
Fig. 15 is a view analogous to Fig. 13, parts being stepped down and shown in positions to receive washers from the magazine and carry the washers to the rubber heel mold.
Figure 16:
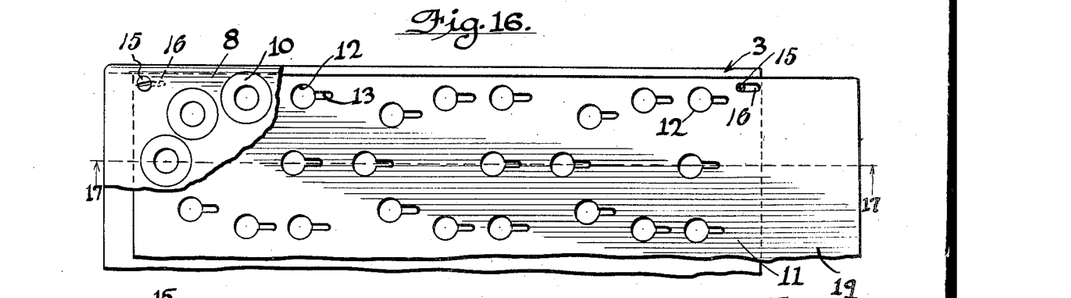
Fig. 16 is a view analogous to Fig. 15 and showing the parts in positions to drop the washers upon the pins in the rubber heel mold.
Figure 17:
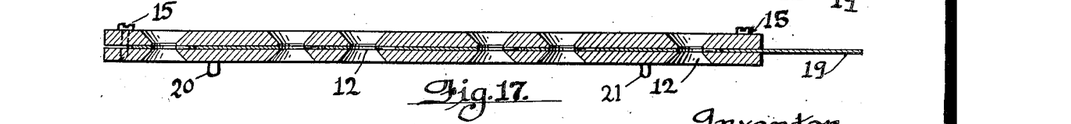
Fig. 17 is a sectional elevation on the line 17—17 of Fig. 18, the parts being shown a step in advance of the position shown in Fig. 14.

The details of the washer guide assembly board 3 are as follows:

The body 8 is a flat rectangular plate having a notch 9 to receive the dowel 2, so as to guide the board on to the mold 1. Washer ports 10 are formed through the body 8, one port for each pin 5 of the gang mold 1, the upper end of the ports 10 being flared and the lower ends of the ports 10 being adapted to pass a desired washer loosely and freely. A supporting plate 11 is mounted against the lower face of the body 8 and has openings 12, one for each port 10, and adapted to receive a washer loosely, and slots 13 extend from the openings 12 all in the same direction, the slots being adapted to receive the points 7 of the pins 5 loosely. The slide plate 11 is held against the body 8 by headed pins 15 inserted downwardly through the body 8 and through slots 16 in the plate. The plate 11 is normally in position to hold the openings 12 out of registration with the ports 10 as shown in Fig. 15, and at this time the points 7 are at the outer ends of the slots 13 so that when the washers come down through the ports 10 the points 7 will be in position to receive the washers.

A second plate 17 is mounted below the plate 11 and has openings 18 in registration with the pins 5 and ports 10, and the pins 15 pass through the plate 17 as required to hold the plate 17 stationary while the plate 11 reciprocates. One side of the plate 11 extends outwardly beyond the side face of the body 8 and forms a handle 19 for operating the plate 11. Supporting pins 20 and 21 project downwardly from the second plate 17 to engage the mold base and unite with the dowel 2 in supporting the guide assembly board.

The layout of the ports 10 must be made to fit the layout of the pins 5 in the mold, but both layouts may be larger or smaller for heels of different sizes, and the washer magazine assembly 22 will feed the washers to the various sizes of layouts, or outwardly to a large layout, or straight down to a medium size layout, so that it is only necessary to make the magazine assembly for a medium size layout, the only requirement being that the layouts of the magazine assembly, the guide assembly and the gang mold, be all of the same type.

Figure 1:
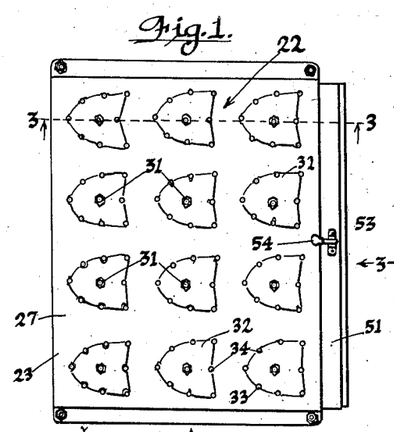
Figure 1 is a top plan view of a machine for feeding washers to rubber heel molds, the view being taken looking in the direction indicated by the arrow 1 in Fig. 2.
Figure 2:
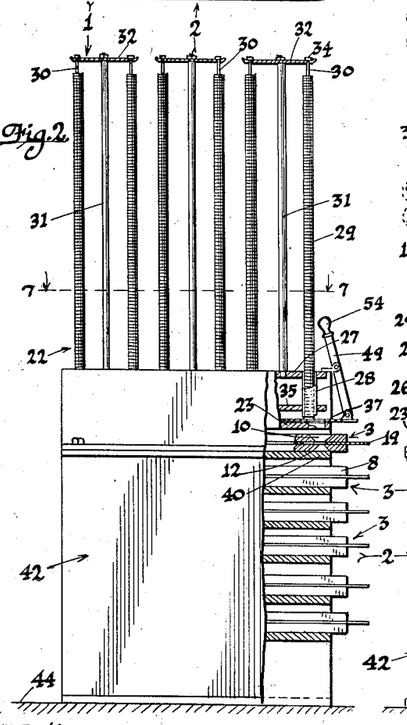
Fig. 2 is a side elevation looking in the direction indicated by the arrows 2 in Figs. 1 and 3, parts beings broken away and shown in section.
Figure 3:
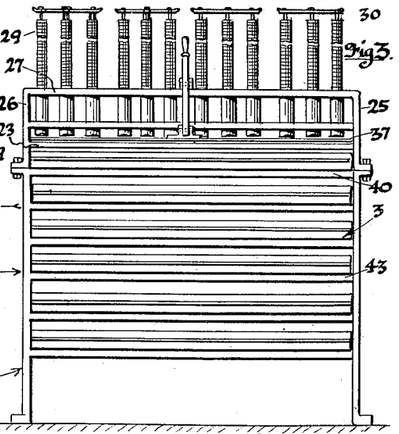
Fig. 3 is a front elevation looking in the direction indicated by the arrows 3 in Figs. 1 and 2.
Figure 4:
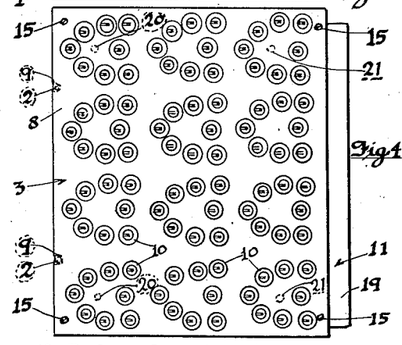
Fig. 4 is a top plan view of a washer guide assembly board.
Figure 5:
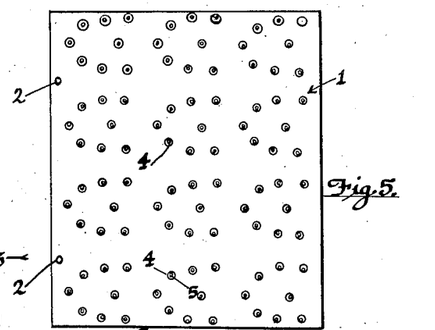
Fig. 5 is a top plan view of a rubber heel mold base.
Figure 6:
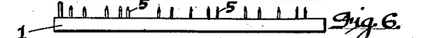
Fig. 6 is a side elevation of the mold base shown in Fig. 5.
Figure 7:
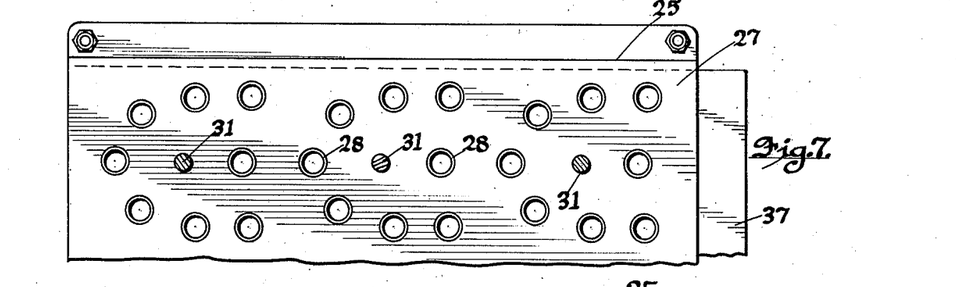
Fig. 7 is an enlarged fragmentary horizontal section on the lines 7—7 of Figs. 2 and 12 and looking downwardly as indicated by the arrows.
Figure 8:
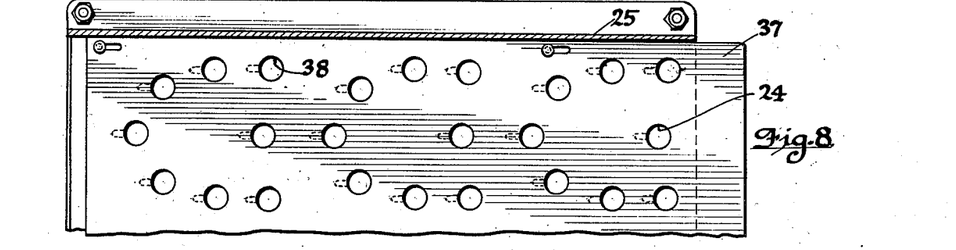
Fig. 8 is a fragmentary horizontal section on the line 8—8 of Fig. 12 and showing the parts in positions to drop washers from the magazine to the guide assembly board.
Figure 9:
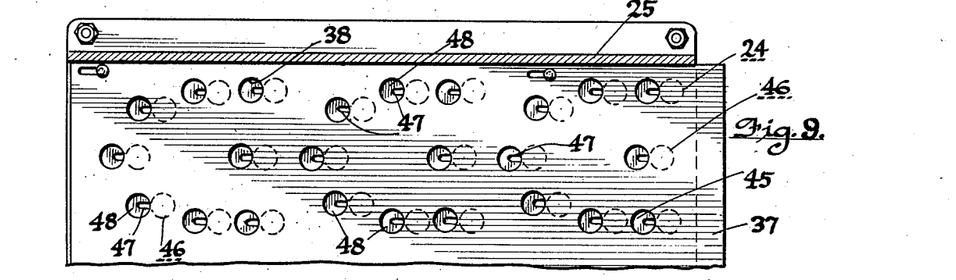
Fig. 9 is a view analogous to Fig. 8 and showing the parts in positions to take a lower washer from each magazine tube, this step immediately preceding the step shown in Fig. 8.
Figure 10:
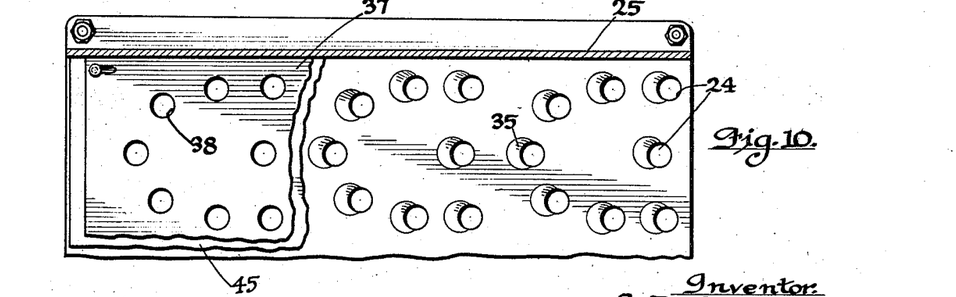
Fig. 10 is a fragmentary view analogous to Figs. 8 and 9 and showing the slide, the carrying plate and the guide plate in their operative relation, as required to feed washers from the magazine tubes and a single washer from each tube simultaneously.
Figure 11:
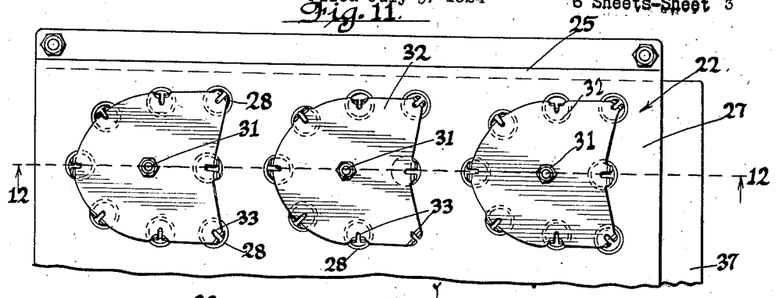
Fig. 11 is a fragmentary top plan view of the magazine as seen looking in the direction indicated by the arrow 11 in Fig. 12.
Figure 12:
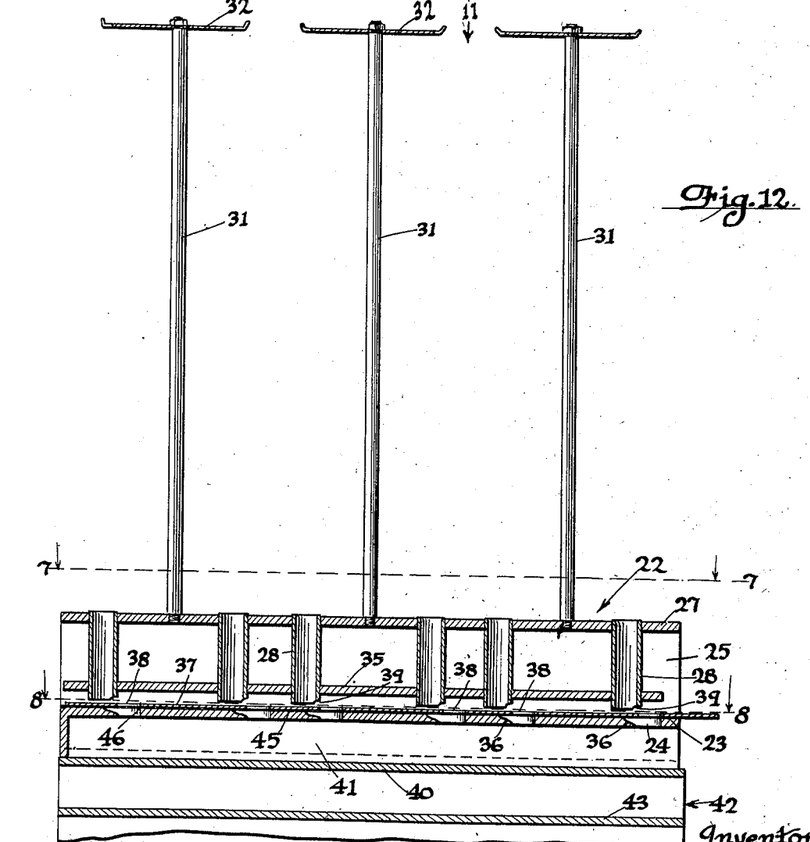
Fig. 12 is a sectional elevation on the line 12—12 of Fig. 11.
Figure 13:
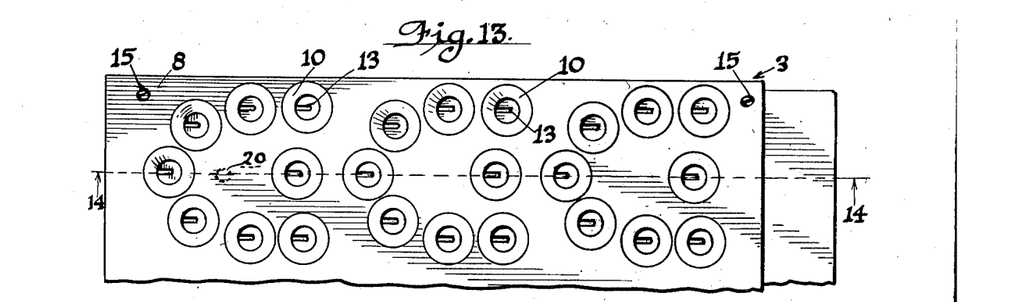
Fig. 13 is an enlarged fragmentary plan of the washer guide assembly board.
Figure 14:
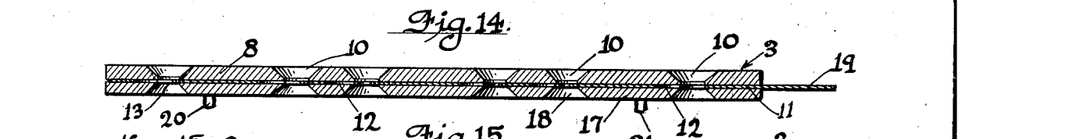
Fig. 14 is a sectional elevation on the line 14—14 of Fig. 13.

The details of the washer magazine assembly 22 are as follows:

A plate 23 has ports 24, the discharge lower ends of which are adapted to register with the flaring upper ends of the ports 10. Side frames 25 and 26 are rigidly secured to the plate 23 and extend upwardly. A top plate 27 is rigidly secured to the side frames 25 and 26. Magazine tubes 28 are mounted through the top plate 27, said tubes being of a size adapted to receive stacks of washers 29, the washers being flatwise one upon another and fitting loosely in the tubes. The washers are preferably strung upon wires 30 and fed into the tubes as shown in Fig. 2. Posts 31 extend upwardly from the top plate 27 and have wire supporting plates 32 at their upper end. The wires 30 fit in notches 33 formed from the edges of the plate 32 and have heads 34 to engage the plates 32 and hold the wires suspended with the discharge ends of the wires extending slightly into the tubes 28 so that the washers 29 stacked upon the wires 30 will be fed through the tubes 28 to the washer guide assembly boards.

A tube supporting plate 35 is mounted between the sides 25 and 26 near the lower ends of the tubes 28. The upper ends of the ports 24 are extended sidewise to form the tracks 36 all leading in the same direction toward and into the ports 24. A sliding feed plate 37 fits upon the plate 23 and has ports 38 to move under the tubes 28 and receive a washer and to move laterally and drop the washer into a port 24. Notches 39 are formed by cutting away portions of the lower ends of the tubes 28 at the sides toward the ports 24 so as to allow the bulged up centers of the washers to pass. A shelf 40 is mounted between the side frames 25 and 26 to make a slideway 41 to receive the washer guide assembly board 3 to be filled with washers. The side frames 25 and 26 rest upon a cabinet 42 having a plurality of shelves 43 to receive a stock of the guide board assemblies 3 and the cabinet 42 may rest upon a floor or shelf 44. The tubes 28 are set slightly offset relative to the discharge ends of the ports 24.

A very thin spring guide plate 45 is rigidly mounted upon the plate 23 and has washer ports 46 registering with the discharge ends of the ports 24 in the plate 23. Slots 47 extend from the ports 46 and the portions of the plate 45 immediately surrounding the slots 46 rest over the tracks 36 so that the metal may spring downwardly to allow uneven washers or washers having burrs to pass. When the sliding feed plate 37 is moved inwardly the washers fall from the tubes 28 into the ports 38 upon the spring portions 48 of the plate 45 around the slots 47, and when the plate 37 is moved outwardly the washers are carried in the ports 38 until they fall through the ports 46. The sliding feed plate 37 is mounted upon the guide plate 45 and slightly spaced below the lower ends of the tubes 28. The washers 29 are more or less irregular and rough and the clearance spaces 39 and the spring plates 48 allow the parts to give slightly to allow rough and uneven washers to pass.

Figure 18:
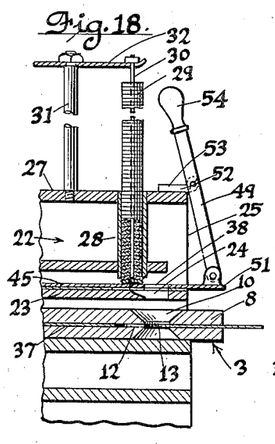
Fig. 18 is a fragmentary sectional elevation of the magazine and washer guide assembly in the magazine ready to receive washers.
Figure 19:
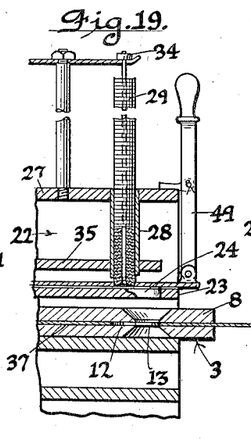
Fig. 19 is a view analogous to Fig. 18 and showing the first step in feeding the washers from the magazine.
Figure 20:
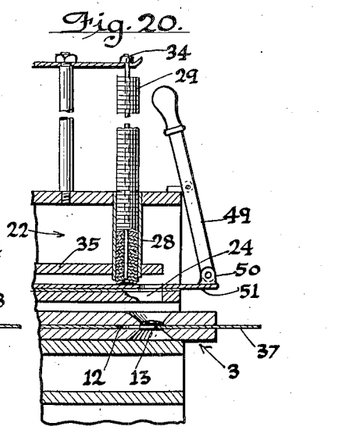
Fig. 20 is a view analogous to Figs. 18 and 19 and showing the final step in feeding the washers to the washer guide assembly, the washer guide assembly being loaded with washers ready for removal from the magazine.
Figure 21:
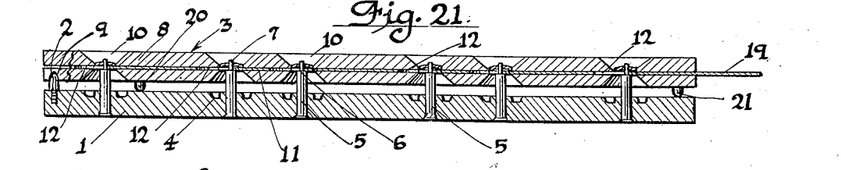
Fig. 21 shows the washer guide assembly board carrying washers and in position upon the rubber heel mold with the washers ready to be released upon the pins.
Figures 22, 23:
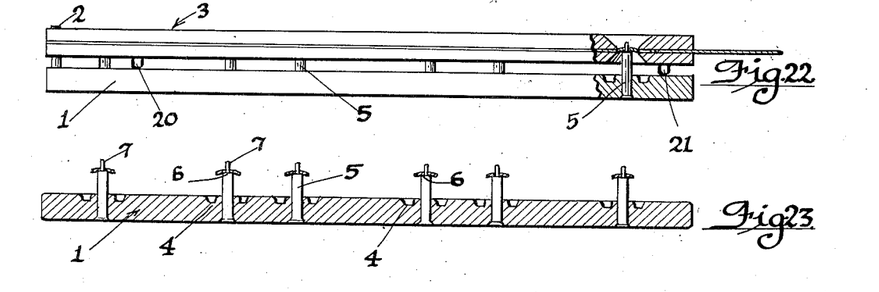
Fig. 22 is a view analogous to Fig. 21 and showing the washers released from the guide assembly 4 and ready to remove the board.
Fig. 23 is a view analogous to Figs. 21 and 22 and showing the board removed and the washers upon the pins ready for casting the heels.

A hand lever 49 is mounted at one side of the main frame, the lower end of the hand lever being pivotally connected to a bearing block 50 fixed upon the projecting portion 51 of the feed plate 37 and the intermediate portion of the hand lever 49 is mounted upon a pivot 52 in a bracket 53 secured to the front side of the top plate 27 and has an operating handle 54 extending upwardly. Normally the handle 54 is pressed backwardly as shown in Fig. 18, so that the stacks of washers 29 rest upon solid portions of the plate 37 and so that when the handle is pulled forwardly the plate 37 will be moved backwardly to bring the ports 38 into registration with the tubes 28 to receive a washer from each tube, and when the handle is again pressed backwardly the plate 37 will be moved forwardly to move the washers forwardly and drop the washers through the ports 24.

In laying out the mold base 1 and the washer guide assembly board 3 the heel layouts are preferably arranged in rows extending across the machine. As soon as the washers have been delivered to all of the pins the guide assembly board 3 is removed, the mold die placed in position and the process of filling the mold and vulcanizing the heels will proceed as usual. The plan is to have several of the washer guide assembly boards 3 and to insert the boards into the magazine one at a time to load the boards with washers and then place the boards in the cabinet for use as the molds are available. When a board 3 is in the slideway 41 the washers from the magazine fall through the ports 24 into the ports 10 and land upon the plate 11, and are carried in this position until the board is applied to the mold base. Then the points 7 extend through the slots 13 until the shoulders 6 engage and support the plate. Then the handle 19 is manually grasped to pull the plate forwardly until the washers will pass through the ports 12 and rest upon the shoulders 6 of the pins 5. Then the board may be raised and the washers left upon the pins. During this operation the points 7 serve as strippers to hold the washers from being carried with the plate 11.

Figure 24:
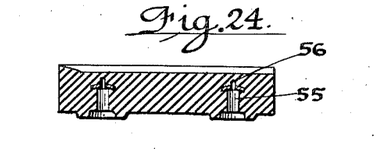
Fig. 24 is a sectional view of a heel with the washers cast in place.

Referring to Fig. 24, the pins 5 form nail holes 55, said holes 55 being considerably larger than the holes 56 through the washers so that nails may be driven through the holes 55 until the heads of the nails fit the lower sides of the washers, and during this operation the washers serve as guides for the nails and the washers form in large heads firmly embedded in the rubber of the heel.

Figure 28:
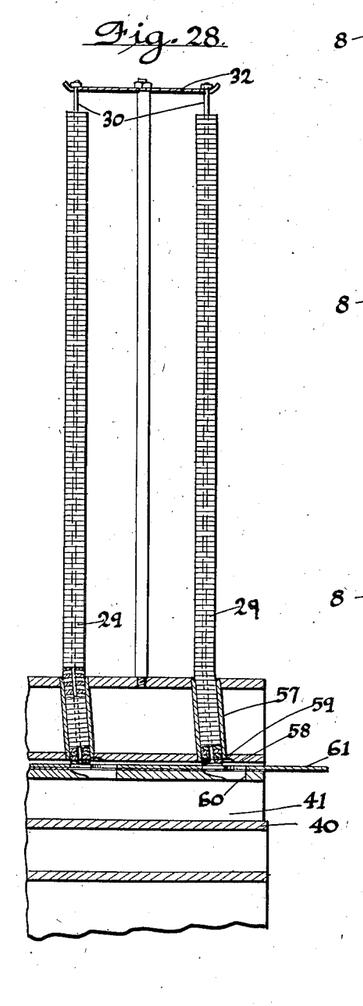
Fig. 28 is a view analogous to Fig. 12 and showing the washers fed from the magazine through inclined tubes instead of straight tubes.

Referring to the modification shown in Fig. 28, the magazine feed tubes 57 are slightly inclined and the lower ends of the tubes 57 are fixed through the bottom board 58 and clearances 59 extend from the lower ends of the tubes toward the ports 60 and the bottom 58 is slightly spaced from the sliding feed plate 61.

Figure 25:
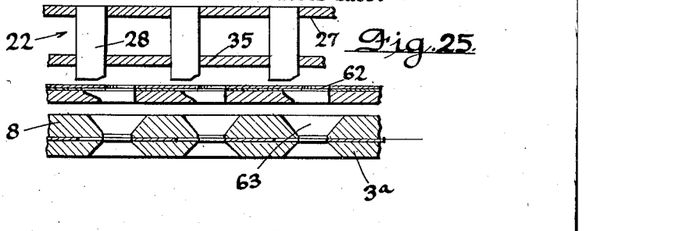
Fig. 25 is a fragmentary sectional detail showing how the washer guide assembly board takes washers from a standard magazine and delivers the washers to be cast into a middle size heel.
Figure 26:
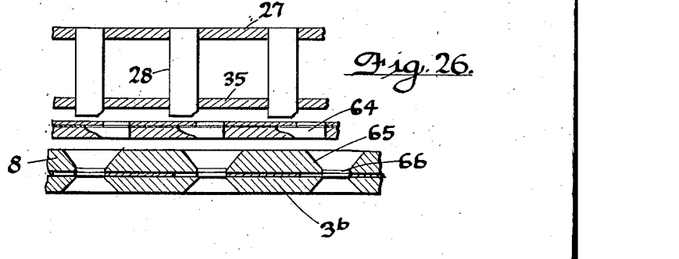
Fig. 26 shows how the washer guide assembly board guides the washers from the same magazine to a larger heel.
Figure 27:
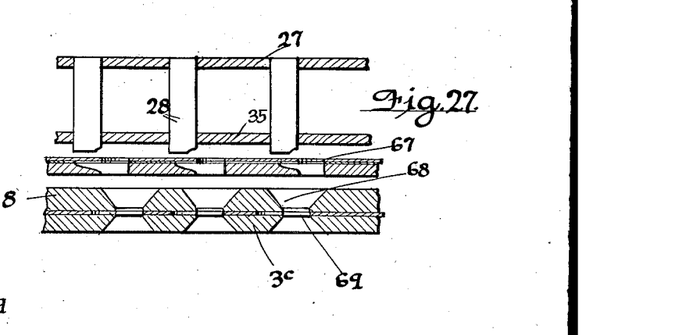
Fig. 27 shows how washers are guided from the same magazine to a smaller heel.

Referring to Figs. 25, 26 and 27, the washer guide assembly board $3^a$ is for a medium size heel and the washers will fall straight down from the ports 62 through the ports 63. The board $3^b$ is for a large size heel and the washers will fall from the ports 64 upon the inclined face 65 of ports 66, thereby spreading the plan of the washers to fit a heel larger than the plan of the magazine. In the board $3^c$ the washers passing through the ports 67 will strike the inclined faces 68 of the ports 69 in the board and be deflected inwardly so as to make a heel plan smaller than the plan of the magazine.

In using concavo-convex washers, it is necessary that the washers be placed upon the wires with their bulging sides upwardly, whereas in the use of flat washers there is no right or wrong side and the washers may be strung upon the wires hit or miss.

While I have necessarily described my present invention somewhat in detail, it will be appreciated that I am not limited thereto, and may vary the size, shape, and arrangement of parts, within wide limits, and be applied for other purposes than heel mold washering, without departing from the spirit of the invention.

Various changes may be made without departing from the spirit of my invention as claimed.

I claim:

1. In a device of the kind described, stationary washer-feeding means, and portable means to receive washers by gravity from said stationary means and subsequently deliver said washers to a gang mold.

2. In a device of the kind described, stationary washer-feeding means, and portable means to receive washers by gravity from said stationary means and subsequently deliver said washers to pins in a gang mold.

3. In a device of the kind described, stationary washer-feeding means, and portable means to receive washers by gravity from said stationary means and subsequently deliver said washers to each of the pins in a gang mold simultaneously.

4. In a device of the kind described, stationary washer-feeding means, and portable means to receive washers from said stationary means and subsequently deliver said washers to a gang mold, and storage means for said portable means.

5. In a device of the kind described, stationary washer-feeding means, and portable means to receive washers from said stationary means and subsequently deliver said washers to pins in a gang mold, and storage means associated with said stationary means for said portable means.

6. In a device of the kind described, stationary washer-feeding means, portable means to receive washers from said stationary means and subsequently deliver said washers to each of the pins in a gang mold simultaneously, said stationary means being provided with storage means for said portable means.

7. A washer feeder comprising a portable washer guide assembly adapted to register with pins in a mold and having means for guiding and placing washers upon the pins, and a stationary washer magazine assembly adapted to feed washers by gravity to the guide assembly.

8. A washer feeder comprising a portable washer guide assembly adapted to register with pins in a mold, and having means for guiding and placing washers upon the pins, and a stationary washer magazine assembly adapted to register with and feed washers by gravity to the guide assembly.

9. The combination with rubber heel gang molds having pins for locating washers of a portable magazine, a plurality of portable washer assemblies having layouts of various sizes to receive washers by gravity from said magazine, and to guide the washers from the magazine to heel layouts of different sizes in said molds.

10. The combination with a rubber heel gang mold base having pins for locating washers, of a portable washer guide assembly adapted to register with and place washers upon the pins, a stationary magazine assembly adapted to feed washers by gravity to the guide assembly, said guide assembly being separable from said magazine.

11. The combination with rubber heel gang mold bases having heel layouts with pins for locating washers, of a washer magazine assembly, cooperating with guide assemblies having layouts of various sizes, said guide assemblies being adapted to receive washers from said magazine assembly and deliver the washers to layouts of various sizes in said mold bases.

12. The combination with rubber heel gang mold bases having heel layouts with pins for locating washers, of a stationary magazine portable guide assemblies having layouts of various sizes to receive washers from said magazine and subsequently deliver the washers to layouts of various sizes in said mold bases.

13. The combination with rubber heel gang mold bases having heel layouts with pins for locating washers, of a stationary magazine, portable guide assemblies having layouts of various sizes to receive washers from said magazine and subsequently deliver the washers to layouts of various sizes in said mold bases, said magazine having means associated therewith to receive and store a plurality of said washer guide assemblies.

14. The combination with rubber heel gang mold bases having heel layouts with pins for locating washers, of a stationary magazine portable guide assemblies having layouts of various sizes to receive washers from said magazine and subsequently deliver the washers to layouts of various sizes in said mold bases, said magazine being attached to a storage cabinet to receive a plurality of said washer guide assemblies.

15. The combination with rubber heel gang molds bases having heel layouts with pins for locating washers, of a stationary magazine portable guide assemblies having layouts of various sizes to receive washers from said magazine and subsequently deliver the washers to layouts of various sizes in said mold bases, said magazine being attached to a cabinet having a plurality of shelves to receive and store a plurality of said washer guide assemblies.

16. The combination with rubber heel gang mold bases, having heel layouts with pins for locating washers of a stationary magazine, portable guide assemblies having layouts of various sizes to receive washers from said magazine and subsequently deliver the washers to layouts of various sizes in said mold bases, said magazine being attached to a cabinet having a plurality of shelves to receive and store a plurality of said washer guide assemblies for subsequent application to said heel gang mold bases.

17. In a washer feeder, a washer guide assembly comprising a flat rectangular body having vertical ports flaring at their upper ends, a fixed plate having ports in line with the first ports, and a second plate slidingly mounted between the body and the first plate, and having ports adapted to pass into and out of registration with the first ports as required to feed washers from the first ports through the ports of the fixed plate.

18. In a washer feeder, a washer guide assembly comprising a flat rectangular body having vertical ports with flaring upper ends, a plate fitting against the bottom of the body and having slotted ports to move into and out of registration with the first ports, a second plate rigidly mounted below the sliding plate and having ports in registration with the first ports, and means for operating the sliding plate so as to feed washers from the first port through the ports of the rigid plate.

19. The combination with a rubber heel gang mold base having heel layouts arranged in rows, each layout having pins for locating washers, of a washer guide assembly comprising a flat rectangular body having vertical flaring ports in registration with the pins, a plate rigidly mounted relative to the body and having ports in registration with the first ports and pins, a second plate slidingly mounted between the rigid plate and the body and having ports and slots extending from the ports, the slots being adapted to receive the points of the pins, so that the washers will pass into position with the points extending into the holes in the washers and hold the washers while the plate is moved to bring the ports all into registration and allow the washers to drop upon the pins.

20. In a washer feeder, a washer guide assembly comprising a flat rectangular body having vertical flaring ports in registration with the pins, a plate rigidly mounted relative to the body and having ports in registration with the first ports and pins, a second plate slidingly mounted between the rigid plate and the body and having ports and slots extending from the ports, the slots being adapted to receive the points of the pins, so that the washers will pass into position with the points extending into the holes in the washers and hold the washers while the plate is moved to bring the ports all into registration and allow the washers to drop upon pins in a mold.

21. In a washer feeder, a washer magazine assembly comprising a suitable frame, magazine tubes rigidly mounted in the frame, a plate rigidly mounted in the frame and having ports out of alinement with the tubes, a plate slidingly mounted above the first plate and having ports adapted to receive one washer for each port and adapted to move the washers into registration with the first ports so that the washers will fall through the first ports, and a washer guide assembly into which the washers fall and adapted to guide and place the washers upon pins in a mold.

22. In a washer feeder, a washer magazine assembly comprising a suitable frame, magazine tubes rigidly mounted in the frame, a plate rigidly mounted in the frame and having ports out of alinement with the tubes, a plate slidingly mounted above the first plate and having ports adapted to receive one washer for each port and adapted to move the washers into registration with the first ports so that the washers will fall through the first ports; and a washer guide assembly comprising a flat rectangular body having vertical flaring ports in registration with the pins, a plate rigidly mounted relative to the body and having ports in registration with the first ports and pins, a second plate slidingly mounted between the rigid plate and the body and having ports and slots extending from the ports, the slots being adapted to receive the points of the pins, so that the washers will pass into position with the points extending into the holes in the washers and hold the washers while the plate is moved to bring the ports all into registration and allow the washers to drop upon pins in a mold.

23. In a washer feeder, a washer magazine assembly comprising magazine tubes rigidly mounted, wire supports mounted above the tubes, wires upon which washers may be stacked and the wires supported by the wire supports in position to discharge washers into the tubes, and means for feeding the washers one at a time from each tube.

24. In a device for loading washers into heel molds, the combination with a plurality of washer-receiving pins, of a washer-positioning member having washer-receiving apertures in line with said pins, the latter extending into the apertures, and a delivery plate situated beneath the washer-positioning member and provided with apertures having the same arrangement as those in the positioning member, said delivery plate being shiftable to bring the apertures therein into and out of alinement with those in the positioning member.

25. In a device for loading washers into heel molds, the combination with a plurality of washer-receiving pins, of a washer-positioning member having washer-receiving apertures in line with said pins, the latter extending into the apertures, and a delivery plate situated beneath the washer-positioning member and provided with apertures having the same arrangement as those in the positioning member, said delivery plate being shiftable to bring the apertures therein into and out of alinement with those in the positioning member, said pins passing through the delivery plate.

26. In a device of the class described, the combination with a plurality of washer-receiving pins, of a washer-positioning member having washer-receiving openings in line with the pins, the latter extending into the openings, and means beneath the positioning member to cause washers to be delivered singly through each opening onto the corresponding pin.

27. The combination with a heel mold having a plurality of washer-receiving pins, of a washer-loading device, comprising a washer-positioning tray provided with washer-receiving apertures having the same relative arrangement as that of the pins, means for detachably supporting the washer-positioning plate above said pins with the apertures in line therewith and with the pins entering said apertures and means beneath the plate to deliver a single washer through each aperture onto the corresponding pin.

28. The combination with a heel mold having a plurality of washer-receiving pins, of a washer-loading device comprising a washer-positioning tray provided with washer-receiving apertures having the same relative arrangement as that of the pins, means for detachably supporting the washer-positioning plate above said pins with the apertures in line therewith and with the pins entering said apertures, and a delivery plate situated beneath the washer-positioning plate and provided with similarly-spaced apertures, said plate being shiftable to bring its apertures into and out of line with those in the positioning plate.

29. In a device of the class described, the combination with a heel mold having a plurality of washer-receiving pins, of a washer-positioning plate provided with washer-receiving apertures having the same relative arrangement as that of the pins, a washer-delivering plate also having similarly spaced apertures and shiftable relative to the positioning plate to bring its apertures into and out of alinement with those of the positioning plate, and means for supporting the two plates with the apertures in the positioning plate in alinement with the pins and with the pins partially entering said apertures.

30. In a device of the class described, the combination with a plurality of washer-receiving pins, of a washer-positioning member having washer-receiving apertures in line with said pins, each aperture having a flared mouth and a delivery plate situated beneath the washer-positioning member and provided with apertures having the same arrangement as those of the positioning member, said delivery plate being shiftable to bring the apertures therein into and out of alinement with those in the positioning member.

In testimony whereof I have signed my name to this specification.

E. B. CARTER.